(12) United States Patent
Saito et al.

(10) Patent No.: US 8,436,123 B2
(45) Date of Patent: May 7, 2013

(54) COMPOSITION FOR COATING AGENT

(75) Inventors: Shun Saito, Tokyo (JP); Satoshi Fujita, Tokyo (JP); Koichi Sasaki, Tokyo (JP); Sho Masuda, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 96 days.

(21) Appl. No.: 12/878,064

(22) Filed: Sep. 9, 2010

(65) Prior Publication Data

US 2010/0331482 A1 Dec. 30, 2010

Related U.S. Application Data

(63) Continuation of application No. PCT/JP2009/054694, filed on Mar. 11, 2009.

(30) Foreign Application Priority Data

Mar. 14, 2008 (JP) ................................. 2008-066717

(51) Int. Cl.
C08G 77/24 (2006.01)
(52) U.S. Cl.
USPC ............................................. 528/34; 528/36
(58) Field of Classification Search .................... 528/34, 528/36
See application file for complete search history.

(56) References Cited

U.S. PATENT DOCUMENTS 4,804,709 A * 2/1989 Takago et al. .................. 525/102
5,106,895 A 4/1992 Hiraguri et al.
5,698,628 A * 12/1997 Masuda et al. ................ 524/806

FOREIGN PATENT DOCUMENTS

| EP | 0 430 628 A1 | 6/1991 |
|---|---|---|
| JP | 62-558 | 1/1987 |
| JP | 62-149764 | 7/1987 |
| JP | 63-30571 | 9/1988 |
| JP | 4-275379 | 9/1992 |
| JP | 4-283248 | 10/1992 |
| JP | 7-126433 | 5/1995 |
| JP | 7-166078 | 6/1995 |
| JP | 07-286126 | 10/1995 |
| JP | 9-302286 | 11/1997 |
| JP | 2000-086976 | 3/2000 |
| JP | 2000-212501 | 8/2000 |

OTHER PUBLICATIONS

JP 2000 212501 machine translation.*
Extended European Search Report issued Feb. 1, 2011 in EP 09 71 9235.

* cited by examiner

*Primary Examiner* — Kuo-Liang Peng
(74) *Attorney, Agent, or Firm* — Oblon, Spivak, McClelland, Maier & Neustadt, L.L.P.

(57) ABSTRACT

A composition for a coating agent including a component A and a component B, wherein the proportion of component A is 10-90 mass % to the total content of component A and component B, wherein component A is a fluoropolymer containing units (A1) based on a fluoroolefin and units (A2) having a compound of formula (1) reacted with units based on a hydroxy group-containing monomer: $OCN(CH_2)_m SiX_nR_{3-n}$ (1) (wherein R is a hydrogen atom or a $C_{1-10}$ monovalent hydrocarbon group, X is a $C_{1-5}$ alkoxy group, n is an integer of 1 to 3, and m is an integer of 1 to 5), wherein component B is a compound of formula (2) and/or a partially hydrolyzed condensate of the compound of formula (2): $(R^1)_{4-a}Si(OR^2)_a$ (2) (wherein each of $R^1$ and $R^2$ are independently a $C_{1-10}$ monovalent hydrocarbon group, and a is an integer of 1 to 4).

11 Claims, No Drawings

COMPOSITION FOR COATING AGENT

TECHNICAL FIELD

The present invention relates to a composition for a coating agent used for forming a coating film on the surface of a substrate, more particularly, it relates to a composition for a fluorinated coating agent.

BACKGROUND ART

A composition for a fluorinated coating agent such as a coating material, a hard coating agent or a substrate protecting coating fluid, is excellent in the weather resistance and the ultraviolet resistance, and is thereby used in a wide range of high-rise buildings, large-sized structures, ships, vehicles, housing, bridges, etc. as a maintenance-free high performance coating agent.

However, in a hot and humid environment with a large amount of sunlight (amount of ultraviolet light), a coating film is deteriorated from such reasons that a large quantity of radical species are generated from a pigment such as a titanium oxide pigment.

A fluorinated resin coating material is a coating material in which a fluoropolymer is blended. The fluororesin coating material has excellent performance in the weather resistance, etc. as compared with a universal resin coating material in which an acrylic resin, a polyester resin, an alkyd resin or the like is blended. However, in order to further increase the stain resistance of the fluororesin coating material and the hardness of the coating film, one having a crosslinked moiety is used as a fluoropolymer, and a curing agent of an aminoplast resin type such as a polyvalent isocyanate compound or a methylated melamine resin is blended. With respect to a coating film obtained from a fluororesin coating material comprising a polyvalent isocyanate compound as a curing agent, the crosslinking manner is urethane crosslinking. However, since the bond energy of the urethane bond is low, the coating film is deteriorated at an early stage under severe conditions.

Further, the following method has been disclosed, in which an alkoxysilane compound or a hydrolysed condensate thereof is blended as a curing agent with the above fluororesin coating material to improve the weather resistance of a coating film.

A fluororesin coating material having an alkoxysilane as a curing agent blended with a fluorocopolymer having no hydrolysable silyl group and having a hydroxy group and an acid radical (Patent Document 1).

A fluororesin coating material having a hydrolysed condensate of tetramethoxysilane blended with a fluorocopolymer essentially containing monomer units based on a fluoroolefin and polymerized units of a monomer having a hydrolysable silyl group directly bonded to e.g. a vinyl group, an allyl group, a butenyl group, a vinyloxy group, an allyloxy group, a (meth)acryloyl group, $CH_2=CHO(CH_2)_3-$, $CH_2=CHCOO(CH_2)_3-$, $CH_2=CHOCO(CH_2)_3-$, $CH_2=C(CH_3)COO(CH_2)_3-$ or $CH_2=C(CH_3)COO(CH_2)_2-O-(CH_2)_3-$ (Patent Document 2). Further, it is disclosed that it is preferred to incorporate monomer units based on a (meth)acrylate in the fluorocopolymer in view of solubility in an organic solvent and flexibility of a crosslinked coating film.

A resin composition for a moisture-curable coating material, which has a fluorocopolymer having alkoxy groups introduced to side chains by reacting a fluorocopolymer having hydroxy groups in side chains with an isocyanate functional silane, and an organopolysiloxane having at least two silanol groups or alkoxysilyl groups in one molecule, blended (Patent Document 3).

Patent Document 1: JP-A-4-275379
Patent Document 2: JP-A-2000-212501
Patent Document 3: JP-A-63-30571

DISCLOSURE OF THE INVENTION

Problems to be Solved by the Invention

With the fluororesin coating material disclosed in Patent Document 1, it is difficult to obtain a uniform coating film since the compatibility of the fluorocopolymer with the alkoxysilane is poor. Further, the time until the coating material is completely cured is very long, and there are problems such as separation of the coating film from a substrate due to poor curing of the coating film and poor weather resistance.

The fluororesin coating material disclosed in Patent Document 2 has a problem of a decrease in the weather resistance due to deterioration of the acrylic moiety in a polymer since when monomer units based on a (meth)acrylate are contained, alternating copolymerizability is low. Further, an olefin monomer having a hydrolysable silyl group is poor in copolymerizability with a fluoroolefin, and the amount of introduction of the hydrolysable silyl groups in the fluorocopolymer is limited.

With respect to the resin composition for a coating material disclosed in Patent Document 3, the compatibility of the fluorocopolymer with the organopolysiloxane is poor, and resin components in the coating film are non-uniform, and problems arise such as poor dispersion of the pigment and a decrease in gloss of the coating film.

It is an object of the present invention to provide a composition for a coating agent capable of forming a coating film excellent in the weather resistance, having high uniformity and having favorable gloss on the surface.

Means to Solve the Problems

The present inventors have conducted extensive studies and as a result, found that a composition for a coating agent exhibiting very excellent weather resistance performance after being cured can be obtained by introducing a specific crosslinkable moiety based on a compound represented by the following formula (1) to a fluoropolymer and using as a curing agent a compound represented by the following formula (2) and/or a partially hydrolysed condensate of the compound represented by the formula (2), and accomplished the present invention.

That is, the present invention provides the following [1] to [12].

[1] A composition for a coating agent, which comprises the following component A and the following component B, wherein the proportion of the component A is from 10 to 90 mass % to the total content of the component A and the component B:

component A: a fluoropolymer containing units (A1) based on a fluoroolefin and units (A2) having a compound represented by the following formula (1) reacted with units based on a hydroxy group-containing monomer, component B: a compound represented by the following formula (2) and/or a partially hydrolysed condensate of the compound represented by the formula (2):

$$OCN(CH_2)_mSiX_nR_{3-n} \qquad (1)$$

wherein R is a hydrogen atom or a $C_{1-10}$ monovalent hydrocarbon group, X is a $C_{1-5}$ alkoxy group, n is an integer of from 1 to 3, and m is an integer of from 1 to 5,

wherein each of $R^1$ and $R^2$ which are independent of each other, is a $C_{1-10}$ monovalent hydrocarbon group, and "a" is an integer of from 1 to 4.

[2] The composition for a coating agent according to the above [1], wherein the units (A2) are polymerized units having a monomer comprising a reaction product of the hydroxy group-containing monomer with the compound represented by the formula (1), polymerized, or units having the compound represented by the formula (1) reacted with hydroxy groups in polymerized units of the hydroxy group-containing monomer.

[3] The composition for a coating agent according to the above [1] or [2], wherein the component A is a fluoropolymer containing the units (A1) and the units (A2) as essential units and optionally containing units (A3) which are units other than the units (A1) and which have no functional group, and units (A4) based on a hydroxy group-containing monomer.

[4] The composition for a coating agent according to the above [3], wherein in the component A, the proportion of the units (A1) is from 10 to 99 mol % and the proportion of the units (A2) is from 1 to 90 mol % to the total content of the units (A1) and the units (A2), the proportion of the units (A3) which are units other than the units (A1) and which have no functional group is from 0 to 89 mol % to the total content of all the units, and the proportion of the units (A4) based on a hydroxy group-containing monomer is from 0 to 30 mol % to the total content of all the units.

[5] The composition for a coating agent according to any one of the above [1] to [4], wherein the compound represented by the formula (1) is at least one compound selected from the group consisting of γ-isocyanatopropyltrimethoxysilane, γ-isocyanatopropyltriethoxysilane, γ-isocyanatopropylmethyldimethoxysilane, γ-isocyanatopropylmethyldiethoxysilane, γ-isocyanatopropyldimethylmethoxysilane, γ-isocyanatopropyldimethylethoxysilane, δ-isocyanatobutyltrimethoxysilane, δ-isocyanatobutyltriethoxysilane, β-isocyanatoethyltrimethoxysilane and β-isocyanatoethyltriethoxysilane.

[6] The composition for a coating agent according to any one of the above [1] to [5], wherein the hydroxy group-containing monomer is at least one monomer selected from the group consisting of a hydroxyalkyl vinyl ether, en ethylene glycol monovinyl ether, a hydroxyalkyl allyl ether, a hydroxyalkyl vinyl ester, a hydroxyalkyl allyl ester and a hydroxyalkyl (meth)acrylate.

[7] The composition for a coating agent according to any one of the above [1] to [6], wherein the component B is at least one compound selected from the group consisting of tetramethoxysilane, tetraethoxysilane, methyltrimethoxysialne, methyltriethoxysilane, phenyltrimethoxysilane, phenyltriethoxysilane, hexyltrimethoxysilane, hexyltriethoxysilane, decyltrimethoxysilane, trifluoropropyltrimethoxysilane, dimethyldimethoxysilane, dimethyldiethoxysilane, diphenyldimethoxysilane and diphenyldiethoxysialne, and/or a partially hydrolysed condensate of the compound.

[8] The composition for a coating agent according to any one of the above [1] to [7], wherein the fluoroolefin is tetrafluoroethylene and/or trifluoroethylene.

[9] The composition for a coating agent according to any one of the above [1] to [8], which contains a curing catalyst (component C).

[10] The composition for a coating agent according to the above [9], wherein the component C is at least one curing catalyst selected from the group consisting of a reaction product of an acidic phosphate with an amine, and an acidic phosphate.

[11] The composition for a coating agent according to any one of the above [1] to [10], which contains a weak solvent (component D).

[12] The composition for a coating agent according to any one of the above [1] to [11], which contains titanium oxide.

Effects of the Invention

According to the present invention, a composition for a fluorinated coating agent capable of forming a coating film excellent in the weather resistance, having high uniformity and having favorable gloss on the surface, can be obtained. The composition is useful as a maintenance-free high performance coating agent.

BEST MODE FOR CARRYING OUT THE INVENTION

Now, the present invention will be described in further detail.

The composition for a coating agent of the present invention comprises the following component A and component B.
<Component A>

The component A is a fluoropolymer (hereinafter sometimes referred to as a fluoropolymer (A1)) containing units (A1) based on a fluoroolefin and units (A2) based on a reaction product of a hydroxy group-containing monomer with a compound represented by the above formula (1) (hereinafter sometimes referred to as a compound (1)).

In the present invention, polymerized units which are monomer units directly obtained by polymerization of a monomer and repeating units obtained by chemically converting polymerized units will be generically referred to as units.

[Fluoroolefin]

A fluoroolefin is a compound having at least one hydrogen atom in an olefin hydrocarbon (general formula: $C_nH_{2n}$) substituted by a fluorine atom. The number of hydrogen atoms substituted by a fluorine atom (hereinafter referred to as a fluorine addition number) among hydrogen atoms in the olefin hydrocarbon is preferably at least 2, more preferably from 3 to 4. When the fluorine addition number is at least 2, the coating film will have sufficient weather resistance. In the fluoroolefin, at least one hydrogen atom not substituted by a fluorine atom may be substituted by a chlorine atom.

The fluoroolefin may, for example, be a $C_{2-3}$ fluoroolefin such as tetrafluoroethylene, chlorotrifluoroethylene, hexafluoropropylene, vinylidene fluoride or vinyl fluoride, and is particularly preferably tetrafluoroethylene or trifluoroethylene.

The fluoroolefin may be used alone or may be used in combination of two or more.

The units (A1) based on a fluoroolefin in the present invention are preferably polymerized units of a fluoroolefin.

[Hydroxy Group-Containing Monomer]

The hydroxy group-containing monomer is a monomer containing a hydroxy group in addition to having a polymerizable reactive group copolymerizable with the fluoroolefin.

The polymerizable reactive group is preferably an ethylenic unsaturated group such as a vinyl group, an allyl group or a (meth)acryloyl group.

Specific examples of the hydroxy group-containing monomer include a hydroxyalkyl vinyl ether such as hydroxyethyl vinyl ether, hydroxybutyl vinyl ether and cyclohexanedimethanol monovinyl ether; an ethylene glycol monovinyl ether such as diethylene glycol monovinyl ether, triethylene glycol monovinyl ether and tetraethylene glycol monovinyl ether; a hydroxyalkyl allyl ether such as hydroxyethyl allyl ether, hydroxybutyl ally ether and cyclohexanedimethanol monoallyl ether; a hydroxyalkyl vinyl ester such as hydroxyethyl vinyl ester, hydroxybutyl vinyl ester and cyclohexanedimethanol monovinyl ester; a hydroxyalkyl allyl ester such as hydroxyethyl allyl ester, hydroxybutyl allyl ester and cyclohexanedimethanol monoallyl ester; and a hydroxyalkyl (meth)acrylate such as hydroxyethyl (meth) acrylate.

Among them, in view of excellent alternating copolymerizability and favorable weather resistance of a coating film to be formed, preferred is a hydroxyalkyl vinyl ether or an ethylene glycol monovinyl ether, and particularly preferred is hydroxyethyl vinyl ether, hydroxybutyl vinyl ether or diethylene glycol monovinyl ether.

The hydroxy group-containing monomer may be used alone or in combination of two or more.

<Compound Represented by the Formula (1)>

In the above formula (1), R is a hydrogen atom or a $C_{1-10}$ monovalent hydrocarbon group.

If the number of carbon atoms in the monovalent hydrocarbon group exceeds 10, the compound (1) tends to be bulky, whereby the condensation reaction of the alkoxy group (X) is less likely to proceed when the coating film is cured due to steric hindrance. Accordingly, poor curing of the coating film and a decrease in the weather resistance are likely to result, such being unfavorable.

The number of carbon atoms in the monovalent hydrocarbon group is preferably from 1 to 5, more preferably 1 or 2. R is preferably a methyl group or an ethyl group.

X is a $C_{1-5}$ alkoxy group, preferably an ethoxy group or a methoxy group. When the number of carbon atoms of X is at most 5, an alcohol component formed by the condensation reaction is likely to volatilize and is thereby less likely to remain in the coating film after cured, thus improving the water resistance and the solvent resistance of the coating film.

n is an integer of from 1 to 3, preferably 3.

m is an integer of from 1 to 5, more preferably from 2 to 4. Specific examples of the compound (1) include γ-isocyanatopropyltrimethoxysilane (X=methoxy group, n=3, m=3), γ-isocyanatopropyltriethoxysilane (X=ethoxy group, n=3, m=3), γ-isocyanatopropylmethyldimethoxysilane (X=methoxy group, R=methyl group, n=2, m=3), γ-isocyanatopropylmethyldiethoxysilane (X=ethoxy group, R=methyl group, n=2, m=3), γ-isocyanatopropyldimethylmethoxysilane (X=methoxy group, R=methyl group, n=1, m=3), γ-isocyanatopropyldimethylethoxysilane (X=ethoxy group, R=methyl group, n=1, m=3), δ-isocyanatobutyltrimethoxysilane (X=methoxy group, n=3, m=4), δ-isocyanatobutyltriethoxysilane (X=ethoxy group, n=3, m=4), β-isocyanatoethyltrimethoxysilane (X=methoxy group, n=3, m=2) and β-isocyanatoethyltriethoxysilane (X=ethoxy group, n=3 and m=2).

Among such compounds, preferred is γ-isocyanatopropyltrimethoxysilane or γ-isocyanatopropyltriethoxysilane in view of availability.

The compound represented by the formula (1) may be used alone or in combination of two or more.

In the present invention, units (A2) having a compound represented by the formula (1) reacted with units based on a hydroxy group-containing monomer are preferably polymerized units formed by polymerization of a monomer obtained by reacting the hydroxy group of the hydroxy group-containing monomer with the isocyanate group of the compound (1), or units formed by reaction of the hydroxy group of the polymerized units of the hydroxy group-containing monomer with the isocyanate group of the compound represented by the formula (1). By the reaction of the hydroxy group with the compound represented by the formula (1), units having a group represented by the formula —OC(O)NH—$(CH_2)_m$ $SiX_nR_{3-n}$ are formed by the urethane bond (—NHC(O)O—).

[Other Units]

In the present invention, the fluoropolymer (A) may optionally contain other units other than the units (A1) and the units (A2).

Such other units may be units (A3) which are units other than the units (A1) and which contain no functional group. Such units (A3) containing no functional group may, for example, be units containing no hydroxy group. Further, such units (A3) containing no functional group are preferably units containing no fluorine atom nor functional group, preferably polymerized units of a monomer (hereinafter referred to as other monomer) containing no fluorine atom nor functional group. Such other monomer is preferably a vinyl monomer. By the fluoropolymer (A) containing units (A3), adhesion to a substrate on which the composition is applied will be improved, and flexibility will be imparted to the coating film.

The above vinyl monomer may, for example, be a vinyl ester such as vinyl acetate, vinyl pivalate or vinyl benzoate; a vinyl ether such as ethyl vinyl ether, butyl vinyl ether, 2-ethylhexyl vinyl ether or cyclohexyl vinyl ether; an allyl ether such as ethyl allyl ether, butyl allyl ether or cyclohexyl allyl ether; or an olefin such as ethylene or isobutylene.

The vinyl monomer may be used alone or in combination of two or more.

<Process for Producing Fluoropolymer (A)>

The fluoropolymer (A) is preferably produced by the following method (i) or method (ii).

(i) A method in which using a hydroxy group-containing monomer having a moiety copolymerizable with a fluoroolefin and a hydroxy group, the hydroxy group of the monomer and the isocyanate group of the compound (1) are reacted to obtain a reaction product (step (i-1)), and the monomer as the reaction product and the fluoroolefin and as the case requires, other monomer are copolymerized (step (i-2)).

(ii) A method in which a hydroxy group-containing monomer having a moiety copolymerizable with a fluoroolefin and a hydroxy group, and a fluoroolefin, and as the case requires, other monomer are copolymerized to obtain a copolymer having a hydroxy group in its side chain (step (ii-1)), and the isocyanate group of the compound (1) is reacted with the hydroxy group in the side chain (step (ii-2)).

In a case where the method (i) is employed, the units (A2) are polymerized units obtained by polymerizing the monomer which is the reaction product of the hydroxy group-containing monomer with the compound (i).

In a case where the method (ii) is employed, the units (A2) are units having the compound represented by the formula (1) reacted with the polymerized units of the hydroxy group-containing monomer.

The units (A2) in the present invention may be either units, but in the method (i), the polymerization conditions should be strictly controlled and managed in order to prevent gelation during production. Whereas, the method (ii) is more preferred in view of easiness of production of the fluoropolymer (A).

In the addition reaction of the hydroxy group-containing monomer with the compound (1) in the above step (i-1), and in the addition reaction of the hydroxy group-containing copolymer with the compound (1) in the above step (ii-2), it is preferred to react the compound (1) in a proportion of from 0.1 to 10 mol, preferably from 0.5 to 5 mol per 1 mol of the hydroxy groups, in a solvent containing no active hydrogen reactive with the isocyanate group (such as ethyl acetate, methyl ethyl ketone or xylene).

When the proportion of the compound (1) is at least 0.1 mol %, curing will be sufficient, and performance intrinsic in a coating film such as the weather resistance, the impact resistance and the solvent resistance can be sufficiently exhibited. When the proportion of the compound (1) is at most 10 mol, the compound is less likely to remain in a coating film as an unreacted product, and accordingly the water resistance, the solvent resistance, etc. of a coating film will be improved.

In the step (i-1), the reaction of the hydroxy group with the isocyanate group can be carried out with a yield of almost 100%, but in a case where a catalyst is added or the reaction temperature is increased to increase the yield, the reaction product may be gelated. Accordingly, the reaction may be carried out in some cases under conditions where the reaction yield (particularly the degree of conversion) will be lower than 100%. In such a case, after an unreacted hydroxy group-containing monomer is removed from the reaction product, the step (i-2) may be carried out, or the step (i-2) may be carried out while the reaction product contains the unreacted hydroxy group-containing monomer. If a large amount of the hydroxy groups remain in the fluoropolymer (A) obtained in the step (i-2), the compatibility with the component B will be deteriorated, and the physical properties, especially the water resistance of a coating film will be decreased.

In the step (ii-2), it is preferred that at least 50 mol % of the hydroxy groups in the hydroxy group-containing copolymer are reacted with the isocyanate groups of the compound (1) and denatured. If the proportion is less than 50 mol %, compatibility of the fluoropolymer (A) obtained in the step (ii-2) with the component B will be poor, and physical properties especially the water resistance of a coating film will be decreased. Although it is possible to denature 100 mol % of the hydroxy groups, but the larger the amount of use of the compound (1), the more the cost will increase, and accordingly the degree of denaturation is preferably from 50 to 70 mol % in view of the cost.

Either in a case where the step (i-2) is carried out while the unreacted hydroxy group-containing monomer is contained in the method (i) and in a case where less than 100 mol % of the hydroxy groups are reacted with the isocyanate groups of the compound (1) and denatured in the step (ii-2) in the method (ii), the obtained fluoropolymer is a polymer containing units of the hydroxy group-containing monomer. That is, the fluoropolymer of the present invention may further contain units (A4) of the hydroxy group-containing monomer.

The addition reaction in the step (i-1) and the step (ii-2) is preferably carried out usually at from room temperature to 100° C., preferably from 50 to 70° C. in an inert atmosphere of e.g. nitrogen. The reaction time may optionally be changed depending upon the progress of the reaction and is preferably from 1 to 24 hours, particularly preferably from 3 to 5 hours. It is preferred that an organic metal catalyst such as an organotin compound, an organic aluminum compound, an organic zirconium compound or an organic titanate compound is present in the addition reaction system for the purpose of accelerating the reaction.

The step (i-2) and the step (ii-1) may be carried out by means of a known means. For example, a usual radical polymerization method may be employed, and as the polymerization manner, solution polymerization, suspension polymerization, emulsion polymerization or the like may be employed.

The reaction temperature at the time of polymerization depends on the radical polymerization initiator to be used, and is usually from 0 to 130° C., preferably from 30 to 100° C. The reaction time is preferably from about 1 to about 50 hours, more preferably from 5 to 24 hours.

As a solvent, for example, deionized water; an alcohol solvent such as ethanol, butanol or propanol; a saturated hydrocarbon solvent such as n-hexane or n-heptane; an aromatic hydrocarbon solvent such as toluene or xylene; a ketone solvent such as methyl ethyl ketone or cyclohexanone; or an ester solvent such as ethyl acetate or butyl acetate may, for example, be used.

As the radical polymerization initiator, for example, a peroxydicarbonate such as diisopropyl peroxydicarbonate or di-n-propyl peroxydicarbonate; a peroxyester such as t-hexyl peroxypivalate or t-butyl peroxypivalate; a ketone peroxide such as cyclohexanone peroxide or methyl ethyl ketone peroxide; a peroxyketal such as 1,1-bis(t-hexylperoxy)cyclohexane or 1,1-bis(t-butylperoxy)cyclohexane; a peroxycarbonate ester such as t-hexylperoxy-n-butyl carbonate or t-butylperoxy-n-propylcarbonate; a diacyl peroxide such as isobutyl peroxide or lauroyl peroxide; or a dialkyl peroxide such as dicumyl peroxide or di-t-butyl peroxide may be used.

In the case of emulsion polymerization, polymerization is possible in water in the presence of an anionic or nonionic emulsifier using an initiator such as a water-soluble peroxide, a persulfate or a water-soluble azo compound. In the step (i-2), a very small amount of hydrochloric acid or hydrofluoric acid is formed during the polymerization reaction in some cases, and accordingly it is preferred to remove hydrochloric acid or hydrofluoric acid after the polymerization reaction by a buffer (for example, a weak alkali such as potassium carbonate or an acid adsorbing agent such as hydrotalcite).

Instead of the copolymer having a hydroxy group in its side chain obtained in the step (ii-1), a commercially available fluororesin such as LUMIFLON (manufactured by Asahi Glass Company, Limited, tradename), FLUONATE (manufactured by Dainippon Printing Ink Manufacturing, tradename), CEFRAL COAT (manufactured by Central Glass Co., Ltd., tradename), ZAFLON (manufactured by TOAGOSEI CO., LTD., tradename) or ZEFFLE (manufactured by DAIKIN INDUSTRIES, LTD.) may be used.

The fluoropolymer of the present invention is preferably a polymer containing the units (A1) and the units (A2) as essential units and optionally containing the units (A3) which are units other than the units (A1) and which have no functional group and the units (A4) based on a hydroxy group-containing monomer. That is, it is preferably one or more polymers selected from a polymer comprising the units (A1) and the units (A2), a polymer comprising the units (A1), the units (A2) and the units (A3) having no functional group, a polymer comprising the units (A1), the units (A2) and the units (A4) based on a hydroxy group-containing monomer and a polymer comprising the units (A1), the units (A2), the units (A3) having no functional group and the units (A4) based on a hydroxy group-containing monomer, and is more preferably one of these polymers.

The proportion of the units (A1) in the fluoropolymer is preferably from 10 to 99 mol %, more preferably from 30 to 95 mol % to the total content of the units (A1) and the units (A2). When the proportion of the units (A1) is at least 10 mol %, the weather resistance of a coating film will be improved, and when it is at most 99 mol %, adhesion to a substrate will be improved.

The proportion of the units (A2) in the fluoropolymer is preferably from 1 to 90 mol %, more preferably from 5 to 70 mol % to the total content of the units (A1) and the units (A2). When the proportion of the units (A2) is at least 1 mol %, compatibility with the after-mentioned component B will be favorable, and a uniform coating film will be obtained. Further, when it is at most 90 mol %, stability of the fluoropolymer will be improved, and the pot life of a coating agent will be long.

The units (A3) having no functional group are an optional component, and the proportion of the units (A3) is preferably from 0 to 89 mol %, more preferably from 0 to 65 mol % to the total content of all the units. The proportion of the units (A3) being 0 mol % means that no units (A3) are contained, and in a case where the units (A3) are contained, the lower limit is preferably 0.01 mol %. When the proportion of the units (A3) is at most 89 mol %, the weather resistance of a coating film will be improved.

Further, in a case where the units (A4) based on a hydroxy group-containing monomer are contained, the proportion is preferably more than 0 to 30 mol %, more preferably from 1 to 10 mol % to the total content of all the units. When the proportion of the units (A4) based on a hydroxy group-containing monomer is within this range, the weather resistance will be improved, the fluoropolymer will be stabilized, and the gelation or the like is less likely to occur.

The proportions of the respective units constituting the fluoropolymer (A) can be controlled by the amounts of charge of the respective monomers and the reaction conditions in the polymerization reaction to obtain the fluoropolymer (A).

The fluoropolymer (A) is preferably in the form of a solvent solution (hereinafter referred to as a varnish) in which it is dissolved in a weak solvent such as a paraffin solvent or a naphthene solvent in view of the reduction in the environmental burden. The varnish can be obtained by polymerizing the fluoropolymer (A) in a weak solvent or by replacing some of or all the solvent or the dispersion medium with a weak solvent after the polymerization.

The weak solvent in the present invention is one corresponding to either the following (a) or (b).

(a) Gasoline, coal tar naphtha (including solvent naphtha), petroleum ether, petroleum naphtha, petroleum benzin, terpin oil or mineral spirit (including mineral thinner, petroleum spirit, white spirit and mineral turpentine).

(b) A mixture comprising (a) alone.

The mixture comprising (a) alone is a mixture comprising at least two solvents described in (a).

As the weak solvent, a commercially available product such as "Mineral Spirit A", "A Solvent" or "HIAROM 2S" (tradenames) manufactured by NIPPON OIL CORPORATION, "LAWS" or "HAWS" (tradenames) manufactured by Shell Chemicals Japan Ltd., or "PEGASOL 3040" or "PEGASOL AN45" (tradenames) manufactured by Exxon Mobile Corporation may be preferably used.

The fluoropolymer (A) preferably has a number average molecular weight (Mn) of from 5,000 to 20,000 as measured by gel permeation chromatography (GPC) using polystyrene as a standard substance. When Mn is at least 5,000, a favorable weather resistance of a coating film is likely to be obtained. Further, when Mn is at most 20,000, an appropriate viscosity will be obtained, whereby the fluoropolymer is easily handled, and when it is formed into a coating material (viscosity adjustment), it can be diluted with a small amount of a solvent, such being favorable in view of the environmental burden.

<Component B>

The composition for a coating agent of the present invention comprises a compound represented by the above formula (2) and/or a partially hydrolysed condensate thereof as the component B.

The component B forms a coating film by reaction of some of or all the groups represented by —$OR^2$ with the component A.

The component B in the composition for a coating agent is at least one compound represented by the formula (2) or at least one partially hydrolysed condensate of the compound represented by the formula (2), or it may be a combination of them.

In the above formula (2), each of $R^1$ and $R^2$ which are independent of each other, is a $C_{1-10}$ monovalent hydrocarbon group.

The monovalent hydrocarbon group as $R^1$ may have a substituent. That is, some of or all the hydrogen atoms in the monovalent hydrocarbon group may be substituted by a substituent. The substituent is preferably a halogen atom, more preferably a fluorine atom. $R^1$ is preferably a methyl group, a hexyl group, a decyl group, a phenyl group, a trifluoropropyl group or the like. In a case where a plurality of $R^1$'s are present in one molecule, they may be the same or different. It is preferred that the plurality of $R^1$'s are the same in view of supply of the starting material.

The monovalent hydrocarbon group as $R^2$ is preferably a $C_{1-10}$ alkyl group, more preferably a methyl group or an ethyl group. In a case where a plurality of $R^2$'s are present in one molecule, they may be the same or different. If the plurality of $R^2$'s are different from each other, uniformity of a coating film is likely to be decreased due to the difference in reactivity, and accordingly the plurality of $R^2$'s are preferably the same.

In the formula (2), "a" is an integer of from 1 to 4, preferably from 2 to 4.

Specific examples of the compound represented by the formula (2) include a tetrafunctional alkoxysilane such as tetramethoxysilane, tetraethoxysilane and tetraisopropoxysilane; a trifunctional alkoxysilane such as methyltrimethoxysilane, methyltriethoxysilane, phenyltrimethoxysilane, phenyltriethoxysilane, hexyltrimethoxysilane, hexyltriethoxysilane, decyltrimethoxysilane and trifluoropropyltrimethoxysilane; and a bifunctional alkoxysilane such as dimethyldimethoxysilane, diphenyldimethoxysilane, dimethyldiethoxysilane and diphenyldiethoxysilane.

Among them, preferred is tetramethoxysilane, tetraethoxysilane, methyltrimethoxysilane, methyltriethoxysilane, phenyltrimethoxysilane or the like in view of the curing rate and physical properties of a coating film.

The compound represented by the formula (2) may be used alone or as a mixture of two or more.

The partially hydrolysed condensate of the compound represented by the formula (2) is a compound obtained by partially hydrolysing and condensing the compound represented by the formula (2) so that at least two hydrolysable groups (—$OR^2$ groups) remain in its molecule. The whole structure is not clear, but it is a polysilicate ester comprising a skeleton comprising a Si—O bond and an alkoxy group, and the skeleton may be linear, may be branched or may have a cyclic structure.

The method of producing the partially hydrolysed condensate of the compound represented by the formula (2) is not particularly limited, and a known method may suitably be employed. For example, it can be obtained by adding water, an acid and/or a solvent to the compound represented by the formula (2) to partially hydrolyse and condensate the compound.

As such a partially hydrolysed condensate of an alkoxysilane compound, ones differing in the condensation degree, the structure, or the type of the alkoxy group are commercially available. For example, ones having an effective silica content of from about 28 to 52 mass % such as "MKC silicate MS51" or "MKC silicate MS56" (tradenames) manufactured by Mitsubishi Chemical Corporation or "M Silicate 51", "Ethyl Silicate 40" or "Ethyl Silicate 45" (tradenames) manufactured by TAMA CHEMICALS CO., LTD., or ones having such product dissolved in ethanol or isopropanol, such as "HAS-1", "HAS-6" or "HAS-10" (tradenames) manufactured by COLCOAT CO., LTD. may be mentioned.

Here, the "effective silica content" is a value indicating a content of silica as calculated as $SiO_2$ where the amount of the polyalkyl silicate contained in a product is 100 mass %.

The partially hydrolysed condensate of the compound represented by the formula (2) may be used alone or as a mixture of two or more.

In the composition for a coating agent of the present invention, the proportion of the fluoropolymer (A) is from 10 to 90 mass %, preferably from 20 to 80 mass %, more preferably from 30 to 70 mass % to the total content of the fluoropolymer (A) and the component B.

When the content of the fluoropolymer (A) is at least 10 mass %, flexibility of a coating film will be favorable, cracking is less likely to occur in the coating film, and the adhesion will be improved. When the content of the fluoropolymer (A) is at most 90 mass %, the balance with the content of the component B will be favorable, and the weather resistance will be improved.

<Component C: Curing Catalyst>

The composition for a coating agent of the present invention may contain as a component C a curing catalyst for the purpose of accelerating the curing reaction and imparting favorable chemical performance and physical performance to a cured product. Particularly in a case where the composition is cured in a short time at low temperature, the curing catalyst is preferably contained.

Specific examples of the curing catalyst include an acidic phosphate such as monoester phosphate and diester phosphate; an acidic borate such as monoester borate and diester borate; an amine adduct such as an addition reaction product of an acidic phosphate with an amine and an addition reaction product of a carboxylic acid compound with an amine; a metal ester such as tin octylate and dibutyltin dilaurate; a metal chelate such as tris(acetylacetonate)aluminum and tetrakis(acetylacetonate)zirconium; and a metal alkoxide such as aluminum isopropoxide and titanium butoxide.

Among such curing catalysts, preferred is an acidic phosphate in view of curing properties and smoothness of a coating film, and among such acidic phosphates, more preferred is a $C_{1-8}$ monoalkyl phosphate, a $C_{1-8}$ dialkyl phosphate or a mixture thereof in view of curing properties, smoothness of a coating film, the water resistance of a coating film, etc.

The curing catalysts may be used alone or as a mixture of two or more. The addition amount of the curing catalyst is usually within a range of from 0.00001 to 10 mass %, preferably within a range of from 0.01 to 5 mass % to the total solid content of the composition for a coating agent. If the addition amount of the curing catalyst is less than 0.00001 mass %, the catalyst effect tends to be insufficient, and if it exceeds 10 mass %, a coating film to be finally obtained is likely to be colored. Further, the water resistance is likely to be decreased.

<Component D: Solvent>

The composition for a coating agent of the present invention may contain a solvent. As such a solvent, a ketone, an ester, an aromatic hydrocarbon, an ether, an ether ester, an aprotic polar solvent or the like, which has been used, may be used. In view of the reduction in the environmental burden, it is preferred to use a solvent or a weak solvent corresponding to PRTR (Pollutant Release and Transfer Register) or HAPs (Hazardous Air Pollutants) control.

As the weak solvent, preferred is a weak solvent which can be used for the polymerization of the fluoropolymer (A) or solvent replacement, and particularly preferred is mineral spirit or mineral turpentine. The content of the solvent in the composition for a coating agent is suitably determined considering the solubility of the fluoropolymer (A), an appropriate viscosity when the composition is applied as a coating material, the application method, etc.

<Other Resin>

The composition for a coating agent of the present invention may contain other resin in addition to the fluoropolymer (A).

Such other resin may, for example, be a non-fluororesin such as an acrylic resin, a polyester resin, an acrylic polyol resin, a polyester polyol resin, a urethane resin, an acrylic silicone resin, a silicone resin, an alkyd resin, an epoxy resin, an oxetane resin or an amino resin, or a fluororesin other than the fluoropolymer (A). Such other resin may contain a reactive curable moiety. In a case where such other resin is blended, its amount is preferably from 1 to 200 parts by mass, more preferably from 10 to 100 parts by mass per 100 parts by mass of the fluoropolymer (A).

<Other Component>

To the composition for a coating agent of the present invention, as other component, a coloring agent (a pigment or dye), a silane coupling agent for improving the adhesion of a coating film, etc. may be blended.

The pigment may, for example, be an inorganic pigment such as carbon black or titanium oxide, or an organic pigment such as phthalocyanine blue, phthalocyanine green, quinacridone red, indanthrone orange or isoindolinone yellow. The titanium oxide is preferably surface-covered titanium oxide, and such titanium oxide is available as "PFC-105", tradename, manufactured by Ishihara Sangyo Kaisha, Ltd.; "D-918", tradename, manufactured by Sakai Chemical Industry Co., Ltd., etc.

To the composition for a coating agent of the present invention, as the case requires, a light stabilizer, an ultraviolet absorber, a delustering agent or the like may suitably be further added.

The light stabilizer may, for example, be a hindered amine light stabilizer. For example, "MARX LA62" or "MARX LA67" (tradenames) manufactured by Adeka Argus Chemical Co., Ltd.; or "Tinuvin 292", "Tinuvin 144", "Tinuvin-123" or "Tinuvin 440" (tradenames) manufactured by Ciba Specialty Chemicals K.K. may, for example, be mentioned.

The ultraviolet absorber may, for example, be a benzophenone compound, a benzotriazole compound, a triazine compound or a cyanoacrylate compound. As such a compound, "Viosorb 130", "Viosorb 582" or "Viosorb 583" (tradenames, manufactured by KYODO CHEMICAL CO., LTD.) or "Tinuvin 320", "Tinuvin 982", "Tinuvin 1130" or "Tinuvin 400" (tradenames, manufactured by Ciba Specialty Chemicals K.K.) may, for example, be mentioned.

The delustering agent may, for example, be ultrafine synthetic silica. When a delustering agent is used, a graceful semigloss or delustered coating film will be formed.

To the composition for a coating agent of the present invention, a surfactant may be blended. The surfactant can control the surface tension and is effective. Such a surfactant may be any of nonionic, cationic and anionic surfactants, and it may, for example, be LEOREX ASE (manufactured by DAI-ICHI KOGYO SEIYAKU CO., LTD., tradename), a fluorinated surfactant "SURFLON" (manufactured by Asahi Glass Company, Limited, tradename), an acrylic "Modaflow" (manufactured by Monsant Company, tradename), or "LEOFAT" series (manufactured by Kao Corporation, tradename).

Further, to the composition for a coating agent of the present invention, a leveling agent may be blended. When a leveling agent is added, the uniformity in thickness of a coating film will be improved. Such a leveling agent may, for example, be BYK-300 (manufactured by BYK-Chemie, tradename), FLOWLEN No. 3 (manufactured by Kyoeisha Chemical Co., Ltd., tradename) or DISPARLON LF1985 (manufactured by Kusumoto Chemicals, Ltd., tradename).

The amount of such other component can be suitably selected within a rage not to impair the effect of the present invention.

The composition for a coating agent of the present invention can be produced by mixing the above essential components and various additives to be added as the case requires. The mixing order and the addition order are not particularly limited.

As a coating method using the composition for a coating agent of the present invention, an optional method of e.g. by spray coating, by brush coating, by dip coating, by a roll coater or by a flow coater may be applied.

The material of an article to be coated is not particularly limited, and it may, for example, be an inorganic substance such as concrete, field stone or glass; a metal such as iron, stainless steel, aluminum, copper, brass or titanium; or an organic material such as a plastic, a rubber, an adhesive or timber. Further, FRP (Fiber Reinforced Plastics), resin reinforced concrete, fiber reinforced concrete and the like which are organic-inorganic composite materials may also be mentioned.

The composition for a coating agent of the present invention is particularly suitable for coating the surface of an already formed coating film.

The article to be coated may, for example, be a transport equipment such as a vehicle, an electric car or an aircraft; a civil engineering member such as a bridge member or a pylon; an industrial material such as a waterproof sheet, a tank or a pipe; a building member such as a building exterior, a door, a window or gate member, a monument or a pole; a road member such as a median strip of a road, a guard rail, a sound-proof wall, or e.g. polycarbonate or acrylic light-transmitting plate; a communication material; an electric or electronic component.

EXAMPLES

Now, the present invention will be described with reference to Examples, but it should be understood that the present invention is by no means restricted thereto.

Preparation Example 1

Preparation of Fluoropolymer (A-α)

Fluoropolymer (A-α) was prepared in accordance with the above method (ii).

That is, into a stainless steel autoclave having an internal capacity of 3,000 mL equipped with a stirrer, cyclohexyl vinyl ether (284.5 g), 2-ethylhexyl vinyl ether (202.9 g), hydroxybutyl vinyl ether (90.7 g), xylene (722 g), ethanol (189 g) and potassium carbonate (9.5 g) were charged all at once, and dissolved oxygen was removed by nitrogen.

Then, chlorotrifluoroethylene (505 g) was introduced to the autoclave, and the temperature was gradually raised, and after the temperature reached 65° C., a 50 mass % xylene solution (7 g) of t-butyl peroxypivalate was introduced to the autoclave over a period of 7 hours. Then, stirring was carried out further for 15 hours, and then the reaction was terminated.

To the obtained xylene solution of a hydroxy group-containing fluoropolymer, γ-isocyanatopropyltriethoxysilane (154.5 g) and tin octylate (0.5 g) were added, followed by reaction in a nitrogen atmosphere at 50° C. for 5 hours. Further, the solvent replacement by mineral spirit was carried out by evaporation to obtain a mineral spirit solution (non-volatile content: 62.5 mass %, abbreviated as "(A-α) solution" in Tables, the same applies hereinafter) of fluoropolymer (A-α).

The infrared absorption spectrum of the obtained solution was measured, whereupon only a small absorption peak was observed in the absorption band of an isocyanate group, and on the contrary, a large absorption peak was observed in the absorption band of a urethane bond. That is, formation of the component A comprising fluoropolymer (A-α) was confirmed.

Preparation Example 2

Preparation of Fluoropolymer (A-β)

Fluoropolymer (A-β) was prepared in accordance with the above method (i).

That is, into a stainless steel autoclave having an internal capacity of 3,000 mL equipped with a stirrer, hydroxybutyl vinyl ether (90.7 g), γ-isocyanatepropyltriethoxysilane (154.5 g) and tin octylate (0.5 g) were charged all at once, followed by reaction in nitrogen atmosphere at 50° C. for 5 hours.

Then, cyclohexyl vinyl ether (284.5 g), 2-ethylhexyl vinyl ether (202.9 g), xylene (722 g), ethanol (189 g) and potassium carbonate (9.5 g) were charged all at once, and dissolved oxygen was removed by nitrogen.

Then, chlorotrifluoroethylene (505 g) was introduced to the autoclave, and the temperature was gradually raised, and after the temperature reached 65° C., a 50 mass % xylene solution (7 g) of t-butyl peroxypivalate was introduced to the autoclave over a period of 7 hours. Then, stirring was carried out further for 15 hours, and the reaction was terminated.

The obtained xylene solution of fluoropolymer (A-β) was subjected to solvent replacement by mineral spirit by evaporation, to obtain a mineral spirit solution (non-volatile content: 62.5 mass %) of fluoropolymer (A-β).

The infrared absorption spectrum of the solution thus obtained was measured, whereupon only a small absorption peak was observed in the absorption band of an isocyanate group, and on the contrary, a large absorption peak was observed in the absorption band of a urethane bond. That is, formation of component A comprising fluoropolymer (A-β) was confirmed.

Preparation Example 3

Preparation of Fluoropolymer (A-γ)

A xylene solution of a hydroxy group-containing fluoropolymer was obtained in the same manner as in Preparation Example 1 except that the amount of cyclohexyl vinyl ether was changed to 179.3 g, 96.6 g of ethyl vinyl ether was used instead of 202.9 g of 2-ethylhexyl vinyl ether, the amount of hydroxybutyl vinyl ether was changed to 100.7 g, and the amount of xylene was changed to 587.6 g.

γ-Isocyanatepropyltriethoxysilane (171.5 g) and tin octylate (0.5 g) were added thereto, followed by reaction in nitrogen atmosphere at 50° C. for 5 hours to obtain a xylene solution (non-volatile conten: 62.5 mass %) of fluoropolymer (A-γ).

The infrared absorption spectrum of the solution thus obtained was measured, whereupon only a small absorption peak was observed in the absorption band of an isocyanate group, and on the contrary, a large absorption peak was observed in the absorption band of an urethane bond. Formation of the component A comprising fluoropolymer (A-γ) was confirmed.

Comparative Preparation Example 1

Preparation of Fluoropolymer δ

Fluoropolymer δ was prepared without using the compound represented by the formula (1).

That is, a xylene solution of a hydroxy group-containing fluoropolymer was obtained in the same manner as in Preparation Example 1. This hydroxy group-containing fluoropolymer was regarded as fluoropolymer δ. That is, the obtained xylene solution of a hydroxy group-containing fluoropolymer was subjected to solvent replacement by mineral spirit by evaporation, to obtain a mineral spirit solution (non-volatile content: 62.5 mass %) of fluoropolymer δ.

Comparative Preparation Example 2

Preparation of Fluoropolymer ε

Fluoropolymer ε was prepared without using the compound represented by the formula (1).

First, into a stainless steel autoclave having an internal capacity of 3,000 mL equipped with a stirrer, hydroxybutyl allyl ether (101.6 g), vinyl acetate (223.5 g), triethoxyvinylsilane (166.9 g), xylene (722 g), ethanol (189 g) and potassium carbonate (9.5 g) were charged all at once, and dissolved oxygen was removed by nitrogen.

Then, chlorotrifluoroethylene (505 g) was introduced to the autoclave, and the temperature was gradually raised and after the temperature reached 65° C., a 50 mass % xylene solution (7 g) of t-butyl peroxypivalate was introduced to the autoclave over a period of 7 hours. Then, stirring was carried out further for 15 hours, and the reaction was terminated.

Only an ethanol component was distilled off by evaporating the obtained solution of a hydroxy group-containing fluoropolymer to obtain a xylene solution (non-volatile content: 62.5 mass %) of fluoropolymer ε.

Examples 1 to 6, Comparative Examples 1 to 4 and Reference Example 1

Components as identified in Table 1 or 2 were used in the proportion (units: part(s) by mass) as identified in Table 1 or 2, to prepare a composition for a coating agent containing a titanium oxide pigment.

Further, mineral spirit was added so that the viscosity by an Iwata cup (viscosity adjusting instrument) would be 25 seconds to obtain a white enamel coating material. The obtained white enamel coating material was applied on the surface of an aluminum plate subjected to chromate treatment so that the film thickness would be 50 μm, and cured in a thermostatic chamber at 25° C. for one week to form a coating film. The obtained test plate provided with the coating film, "uniformity in coating film", "weather resistance of coating film" and "specular gloss of coating film" were evaluated by the following test methods. The results are shown in Tables 1 and 2.

In Tables 1 and 2, values in brackets ( ) in the section of component A and component (comparative component) used for comparison with component A are non-volatile contents in the respective components. Further, the amount of component A employed to calculated the proportion (A/(A+B), unit: mass %) of component A (fluorocopolymer (A)) to the total content of the fluoropolymer (A) and the component B is the non-volatile content in bracket ( ).

Materials and their abbreviations used in the following Tables 1 and 2 are as follows.

"AP-8": Mixture of mono-2-ethylhexyl phosphate with di-2-ethylhexyl phosphate (manufactured by DAIHACHI CHEMICAL INDUSTRY CO., LTD.).

"D-918": Titanium oxide pigment (manufactured by Sakai Chemical Industry Co., Ltd.).

"BYK-300": Leveling agent (manufactured by BYK-Chemie).

"KR-213": Methyl phenyl silicone resin having a methoxy group (manufactured by Shin-Etsu Chemical Co., Ltd.).

[Test Method]

1. Specular Gloss of Coating Film

Measured in accordance with JIS Z 5400 7.6.

2. Uniformity of Coating Film

The surface of the coating film was observed by a scanning electron microscope and evaluated based on the following standards. Measurement conditions by the scanning electron microscope are as follows.

○: No sea-island structure observed (uniform coating film formed).

x: Sea-island structure observed (non-uniform coating film formed).

<Measurement Conditions>

Testing machine: "JSM-5900LV" manufactured by JEOL Ltd.

Accelerating voltage: 20 kV.

Magnification: 90 magnifications

Treatment before measurement: platinum coating at 20 mA for 45 seconds by an auto-fine coater "JFC-1300" manufactured by JEOL Ltd.

3. Weather Resistance of Coating Film

The test plate provided with the coating film was placed outside in Naha city in Okinawa prefecture, and the specular glosses of the coating film immediately before placement and two years later were measured by means of PG-1 M (gloss meter: manufactured by NIPPON DENSHOKU INDUSTRIES CO., LTD.). The proportion of the value of gloss two years later, where the value of the gloss immediately before placement was 100%, was calculated as the gloss retention (unit: %). The weather resistance was evaluated under the following standards.

○: Gloss retention of at least 80%.

Δ: Gloss retention of at least 60% and less than 80%.

x: Gloss retention less than 60%.

TABLE 1

| | | | Ex. 1 | Ex. 2 | Ex. 3 | Ex. 4 | Ex. 5 | Ex. 6 |
|---|---|---|---|---|---|---|---|---|
| Composition (part(s) by mass) | Component A | (A-α) solution (non-volatile content) | 38.1 (23.8) | 19.0 (11.9) | 45.7 (28.6) | — | — | 38.1 (23.8) |
| | | (A-β) solution (non-volatile content) | — | — | — | 38.1 (23.8) | — | — |
| | | (A-γ) solution (non-volatile content) | — | — | — | — | 38.1 (23.8) | — |
| | Component B | Phenyltrimethoxysilane | 11.9 | — | — | — | — | — |
| | | Methyltrimethoxysilane | — | 23.8 | — | 11.9 | 11.9 | 11.9 |
| | | Tetraethoxysilane | — | — | 7.1 | — | — | — |
| | Component C | AP-8 | 0.2 | 0.2 | 0.2 | 0.2 | 0.2 | 0.1 |
| | | Aluminum tris(acetylacetonate) | — | — | — | — | — | 0.5 |
| | Component D | Mineral spirit | 15.9 | 22.0 | 13.1 | 15.9 | 15.9 | 15.5 |
| | Additive | BYK-300 | 0.1 | 0.1 | 0.1 | 0.1 | 0.1 | 0.1 |
| | Pigment | D-918 | 25.0 | 25.0 | 25.0 | 25.0 | 25.0 | 25.0 |
| | | Total | 91.2 | 90.1 | 91.2 | 91.2 | 91.2 | 91.2 |
| | | A/(A + B) (mass %) | 66.7 | 33.3 | 80.1 | 66.7 | 66.7 | 66.7 |
| Evaluation results | | Specular gloss of coating film | 87 | 86 | 87 | 85 | 86 | 86 |
| | | Uniformity of coating film | ○ | ○ | ○ | ○ | ○ | ○ |
| | | Weather resistance of coating film | ○ | ○ | ○ | ○ | ○ | ○ |

TABLE 2

| | | | Comp. Ex. 1 | Comp. Ex. 2 | Comp. Ex. 3 | Comp. Ex. 4 | Ref. Ex. 1 |
|---|---|---|---|---|---|---|---|
| Composition (part(s) by mass) | Component A | (A-α) solution (non-volatile content) | 38.1 (23.8) | — | 4.0 (2.5) | — | 57.1 (35.7) |
| | Comparative component | Fluoropolymer δ solution (non-volatile content) | — | 38.1 (23.8) | — | — | — |
| | | Fluoropolymer ε solution (non-volatile content) | — | — | — | 38.1 (23.8) | — |
| | Component B | Methyltrimethoxysilane | — | 11.9 | 33.2 | 11.9 | — |
| | Comparative component | KR-213 | 11.9 | — | — | — | — |
| | Component C | AP-8 | 0.2 | 0.2 | 0.2 | 0.2 | 0.2 |
| | Component D | Mineral spirit | 15.9 | 15.9 | 29.3 | 15.9 | 8.8 |
| | Additive | BYK-300 | 0.1 | 0.1 | 0.1 | 0.1 | 0.1 |
| | Pigment | D918 | 25.0 | 25.0 | 25.0 | 25.0 | 25.0 |
| | | Total | 91.2 | 91.2 | 91.2 | 91.2 | 91.2 |
| | | A/(A + B) (mass %) | 100 | 0 | 7.0 | 0 | 100 |
| Evaluation results | | Specular gloss of coating film | 53 | 85 | Measurement impossible | 84 | 85 |
| | | Uniformity of coating film | X | X | | X | ○ |
| | | Weather resistance of coating film | X | Δ | | Δ | Δ |

As evident from the results shown in Tables 1 and 2, the coating films obtained by using the compositions for a coating agent in Examples 1 to 6 were confirmed to be a uniform film in which the component A (fluoropolymer (A)) and the component B were uniformly mixed, from the results of observation of the surface of the coating film.

The above coating films had favorable surface gloss. The coating films exhibited favorable weather resistance under severe exposure conditions such as outdoor in Okinawa prefecture which are under hot and humid conditions with a large amount of ultraviolet light, even though they contained a titanium oxide pigment. These evaluation results are superior to Reference Example 1 in which the component A was contained and no component B was contained.

On the other hand, the composition for a coating agent in Comparative Example 1 in which the component B was changed to a methylphenyl silicone resin having no silylmethoxy group bonded by a urethane bond, had poor compatibility with components contained, and resultingly, a decrease in the gloss of the coating film was observed.

In Comparative Example 2 in which the component A was changed to fluoropolymer δ, the sea-island structure was formed in the coating film, and the coating film was non-uniform. The coating film was also poor in the weather resistance.

Comparative Example 3 is an example in which the proportion of the component A is less than 10 mass %, and cracking occurred in the coating film and no evaluation was possible.

In Comparative Example 4 in which the component A was changed to fluoropolymer ε, the sea-island structure was formed in the coating film, and the coating film was found to be non-uniform. The coating film was also poor in the weather resistance.

INDUSTRIAL APPLICABILITY

The composition for a fluorinated coating agent of the present invention can provide a coating film excellent in the weather resistance, having high uniformity and having favorable gloss on the surface, can be used as a maintenance-free high performance coating agent for a wide range of high-rise buildings, large-sized structures, ships, vehicles, housings and bridges, and is industrially useful.

The entire disclosure of Japanese Patent Application No. 2008-066717 filed on Mar. 14, 2008 including specification, claims and summary is incorporated herein by reference in its entirety.

What is claimed is:

1. A composition for a coating agent, which comprises component A, component B, and component D, wherein the proportion of the component A is from 10 to 90 mass % to the total content of the component A and the component B:

component A: a fluoropolymer containing units (A1) based on a fluoroolefin and units (A2) having a compound of formula (1) reacted with units based on a hydroxy group-containing monomer, component B: a compound of formula (2) and/or a partially hydrolyzed condensate of the compound of formula (2):

$$OCN(CH_2)_m SiX_n R_{3-n} \qquad (1)$$

wherein R is a hydrogen atom or a $C_{1-10}$ monovalent hydrocarbon group, X is a $C_{1-5}$ alkoxy group, n is an integer of from 1 to 3, and m is an integer of from 1 to 5,

$$(R^1)_{4-a} Si(OR^2)_a \qquad (2)$$

wherein each of $R^1$ and $R^2$, which are independent of each other, is a $C_{1-10}$ monovalent hydrocarbon group, and "a" is an integer of from 1 to 4, component D: at least one weak solvent selected from the group consisting of gasoline, coal tar naphtha, solvent naphtha, petroleum ether, petroleum naphtha, petroleum benzin, terpin oil, mineral spirit, mineral thinner, petroleum spirit, white spirit, and mineral turpentine.

2. The composition for a coating agent according to claim 1, wherein the units (A2) are
polymerized units obtained by polymerizing a monomer which is a reaction product of reacting the hydroxy group-containing monomer with the compound of formula (1), or
units having the compound of formula (1) reacted with hydroxy groups in polymerized units of the hydroxy group-containing monomer.

3. The composition for a coating agent according to claim 1, wherein the component A is a fluoropolymer containing the units (A1) and the units (A2) as essential units and optionally containing units (A3) which are units other than the units (A1) and which have no functional group, and units (A4) based on a hydroxy group-containing monomer.

4. The composition for a coating agent according to claim 3, wherein in the component A, the proportion of the units (A1) is from 10 to 99 mol % and the proportion of the units (A2) is from 1 to 90 mol % to the total content of the units (A1) and the units (A2), the proportion of the units (A3) which are units other than the units (A1) and which have no functional group is from 0 to 89 mol % to the total content of all the units, and the proportion of the units (A4) based on a hydroxy group-containing monomer is from 0 to 30 mol % to the total content of all the units.

5. The composition for a coating agent according to claim 1, wherein the compound of formula (1) is at least one compound selected from the group consisting of γ-isocyanatopropyltrimethoxysilane, γ-isocyanatopropyltriethoxysilane, γ-isocyanatopropylmethyldimethoxysilane, γ-isocyanatopropylmethyldiethoxysilane, γ-isocyanatopropyldimethylmethoxysilane, γ-isocyanatopropyldimethylethoxysilane, δ-isocyanatobutyltrimethoxysilane, δ-isocyanatobutyltriethoxysilane, β-isocyanatoethyltrimethoxysilane and β-isocyanatoethyltriethoxysilane.

6. The composition for a coating agent according to claim 1, wherein the hydroxy group-containing monomer is at least one monomer selected from the group consisting of a hydroxyalkyl vinyl ether, an ethylene glycol monovinyl ether, a hydroxyalkyl allyl ether, a hydroxyalkyl vinyl ester, a hydroxyalkyl allyl ester and a hydroxyalkyl (meth)acrylate.

7. The composition for a coating agent according to claim 1, wherein the component B is at least one compound selected from the group consisting of tetramethoxysilane, tetraethoxysilane, methyltrimethoxysialne, methyltriethoxysilane, phenyltrimethoxysilane, phenyltriethoxysilane, hexyltrimethoxysilane, hexyltriethoxysilane, decyltrimethoxysilane, trifluoropropyltrimethoxysilane, dimethyldimethoxysilane, dimethyldiethoxysilane, diphenyldimethoxysilane and diphenyldiethoxysialne, and/or a partially hydrolyzed condensate of the compound.

8. The composition for a coating agent according to claim 1, wherein the fluoroolefin is tetrafluoroethylene and/or trifluoroethylene.

9. The composition for a coating agent according to claim 1, further comprising a curing catalyst as component C.

10. The composition for a coating agent according to claim 9, wherein the component C is at least one curing catalyst selected from the group consisting of a reaction product of an acidic phosphate with an amine, and an acidic phosphate.

11. The composition for a coating agent according to claim 1, further comprising titanium oxide.

* * * * *